A. JONES.
MACHINE FOR SECURING SEALING CAPS TO BOTTLES.
APPLICATION FILED NOV. 17, 1904.
900,550.
Patented Oct. 6, 1908.
10 SHEETS—SHEET 2.
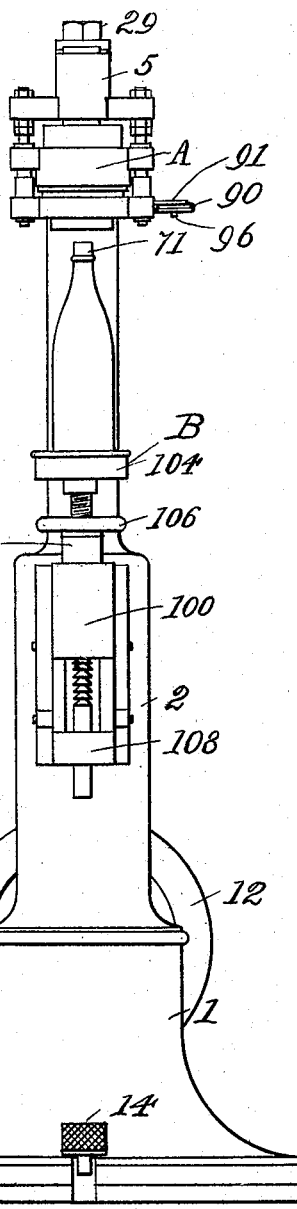
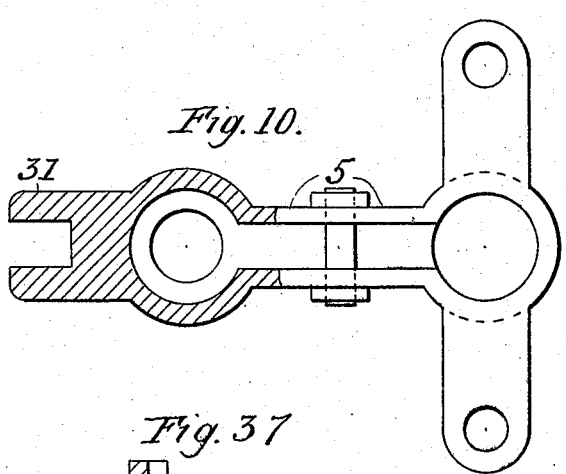
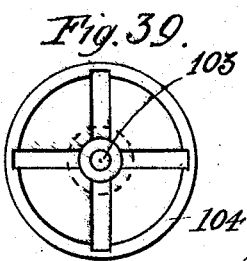
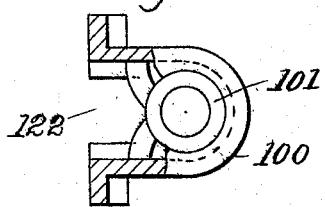
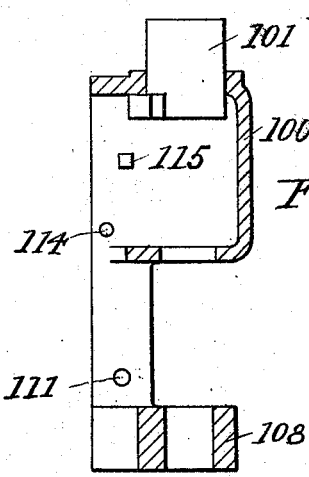
WITNESSES:
INVENTOR.
Albert Jones,
BY
ATTORNEYS.

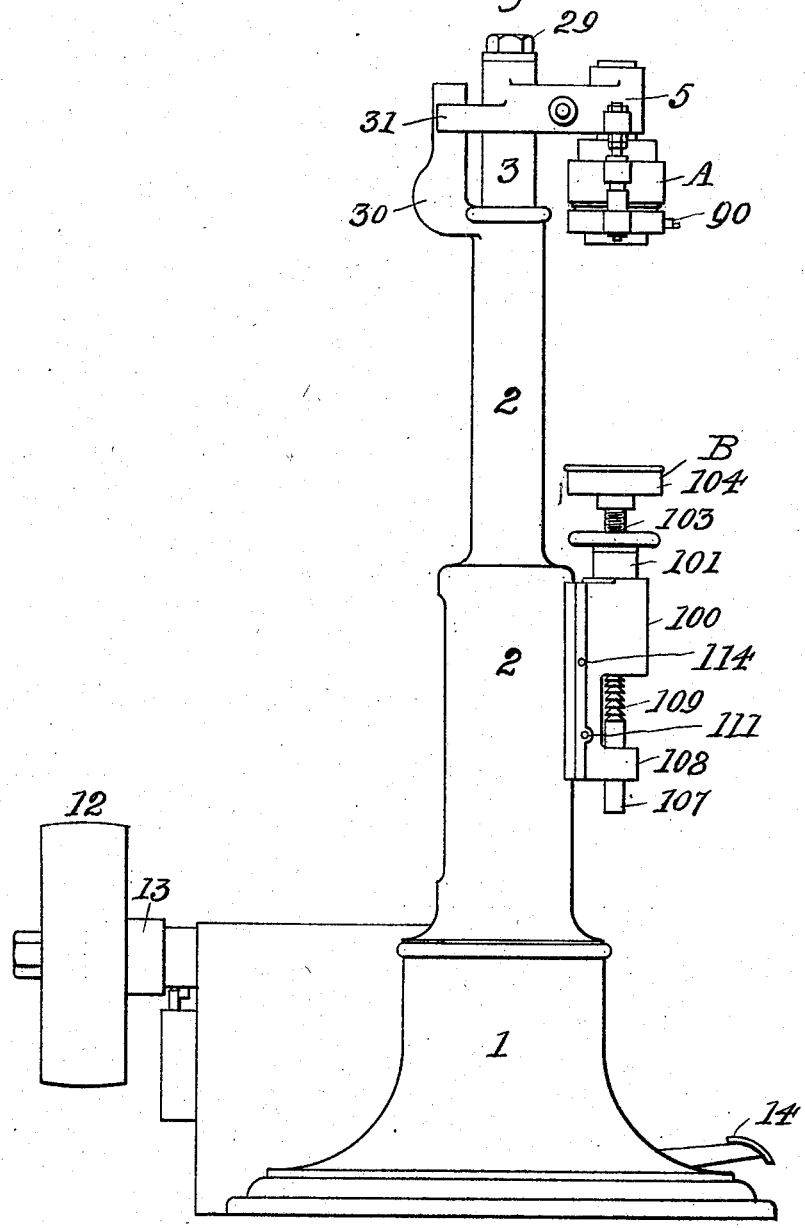

A. JONES.
MACHINE FOR SECURING SEALING CAPS TO BOTTLES.
APPLICATION FILED NOV. 17, 1904.
No. 900,550. Patented Oct. 6, 1908.
10 SHEETS—SHEET 3.
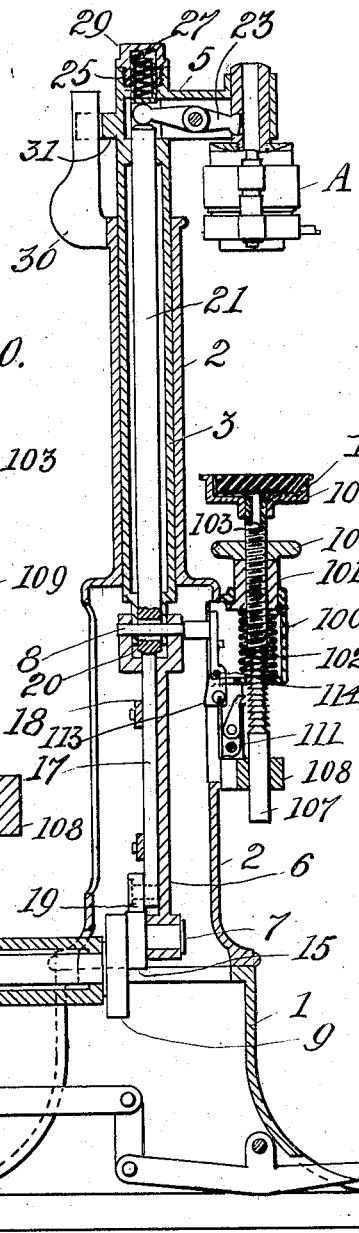
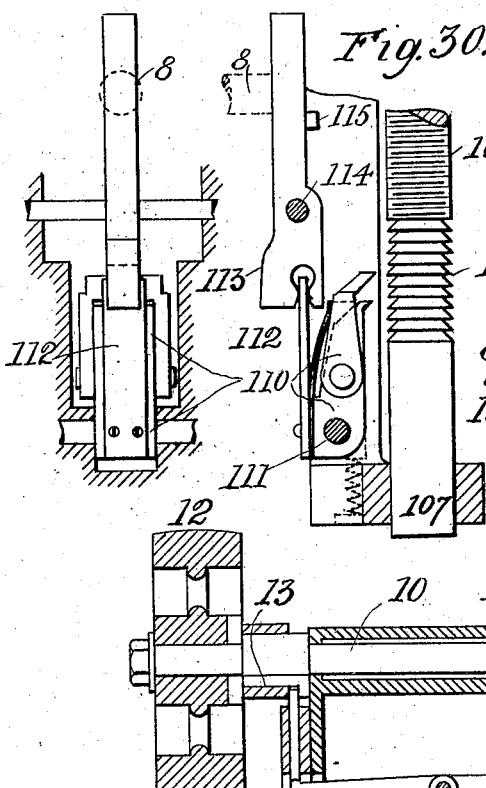
WITNESSES:
INVENTOR.
Albert Jones,
BY
ATTORNEYS.

A. JONES.
MACHINE FOR SECURING SEALING CAPS TO BOTTLES.
APPLICATION FILED NOV. 17, 1904.
900,550.
Patented Oct. 6, 1908.
10 SHEETS—SHEET 4.
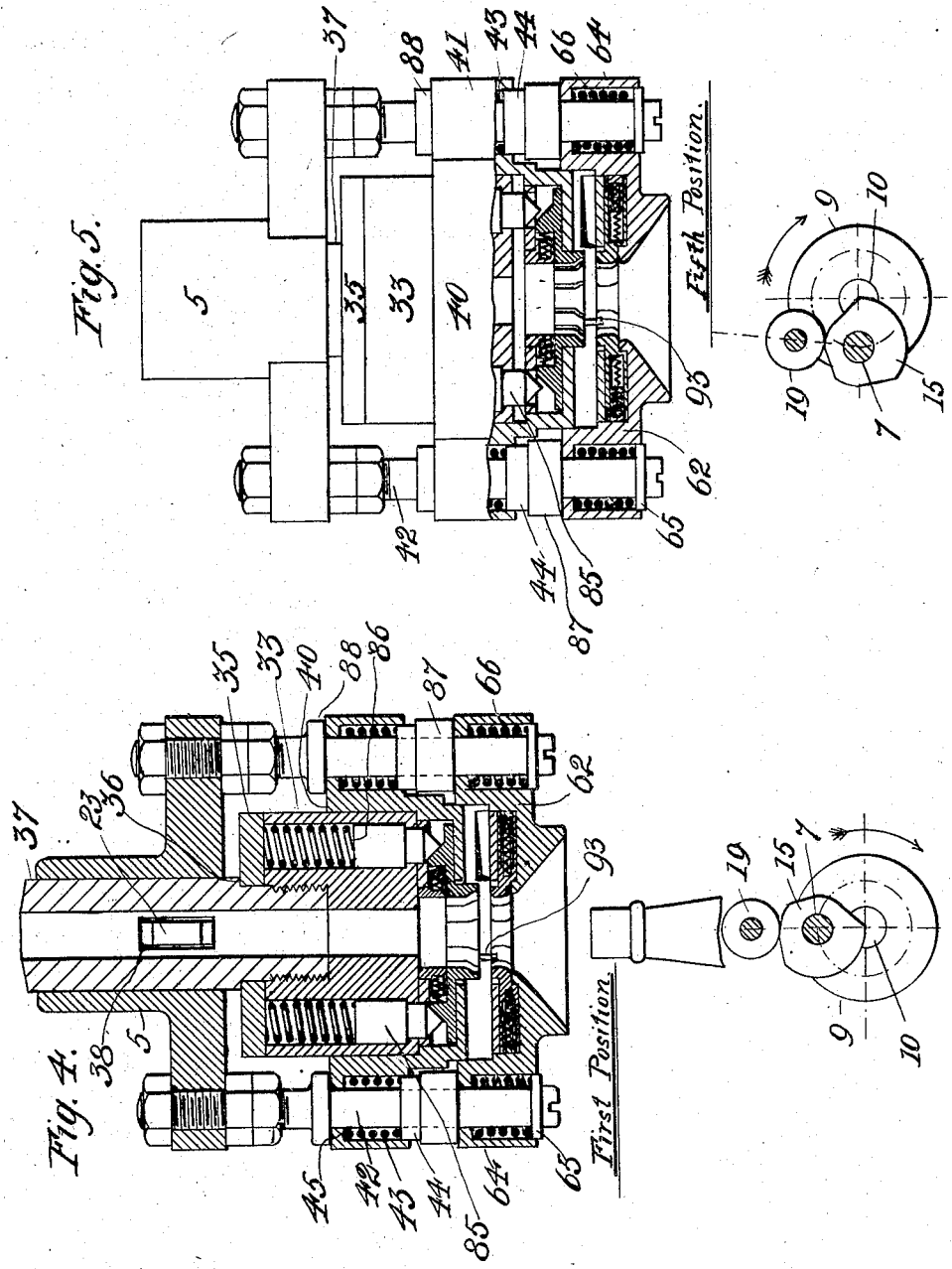
WITNESSES:
INVENTOR.
Albert Jones,
BY
ATTORNEYS.

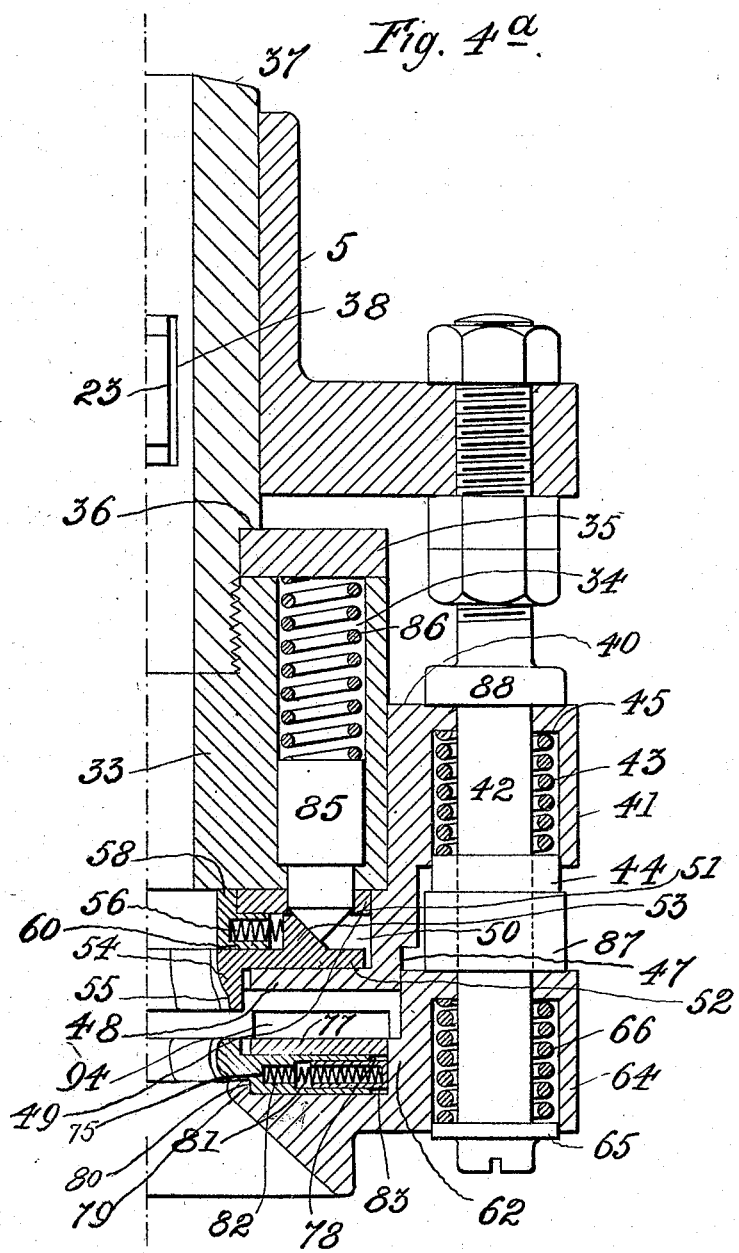

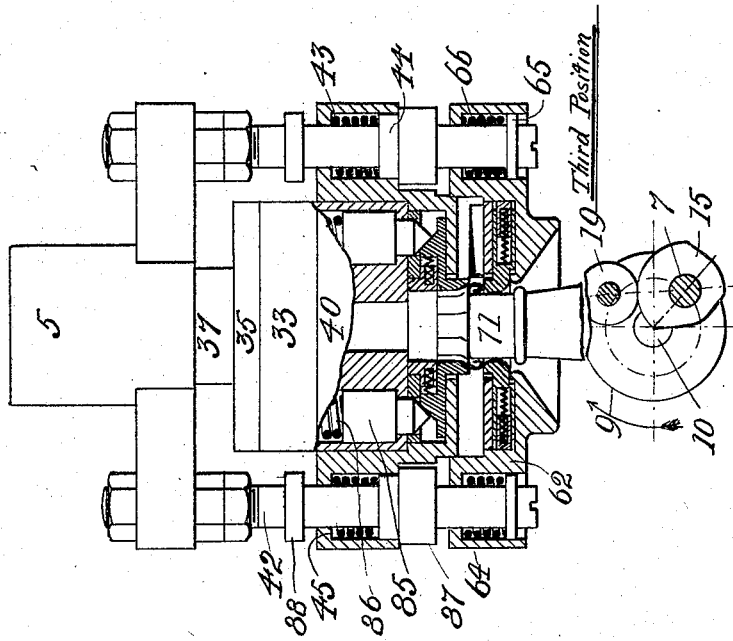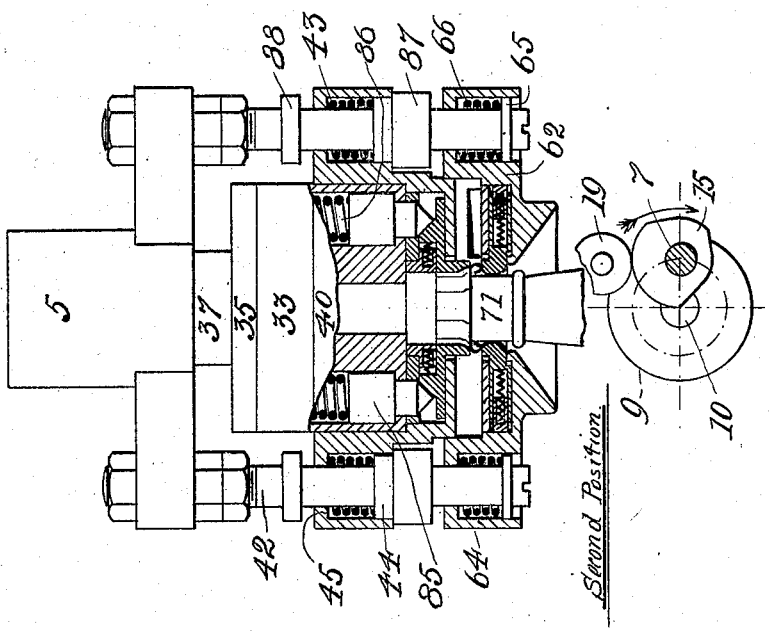

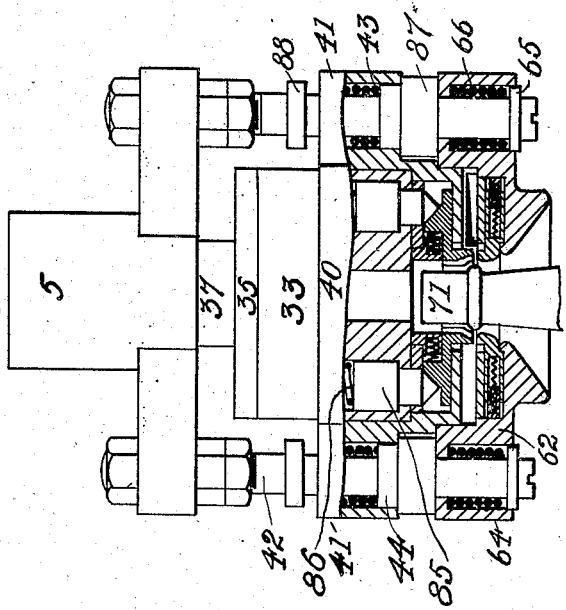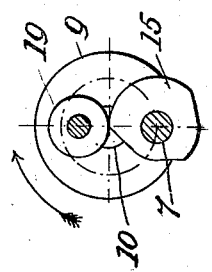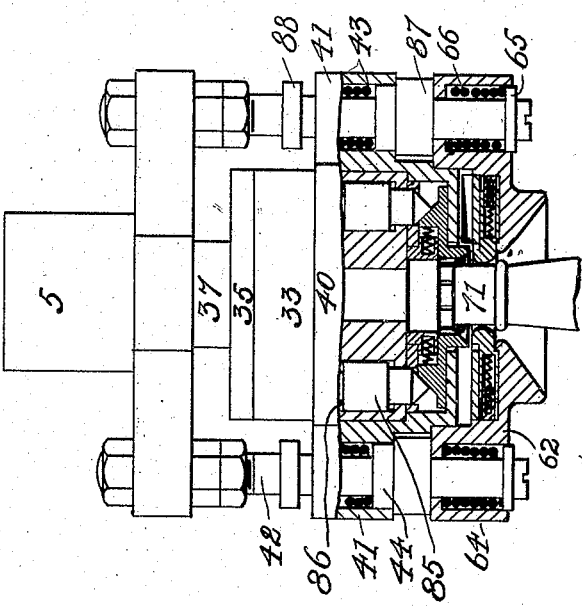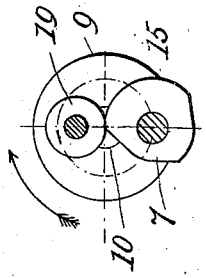

A. JONES.
MACHINE FOR SECURING SEALING CAPS TO BOTTLES.
APPLICATION FILED NOV. 17, 1904.
900,550.
Patented Oct. 6, 1908.
10 SHEETS—SHEET 8.
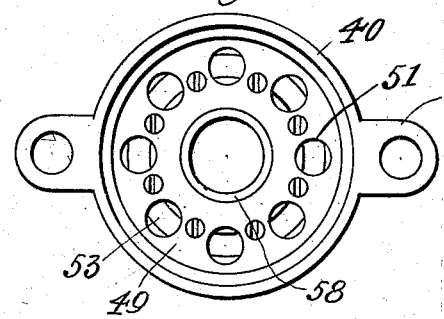
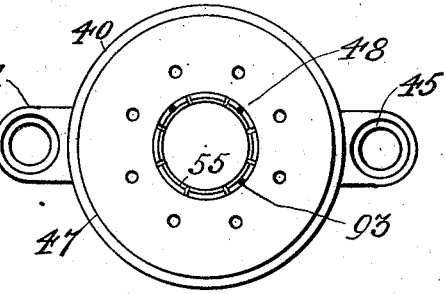
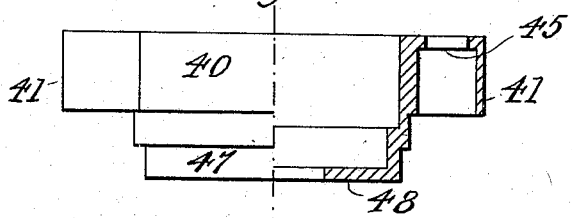
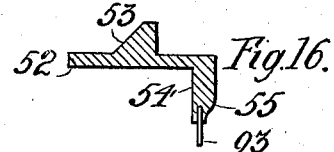
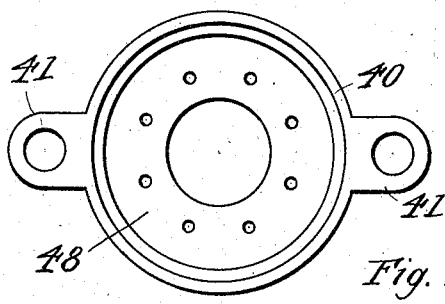
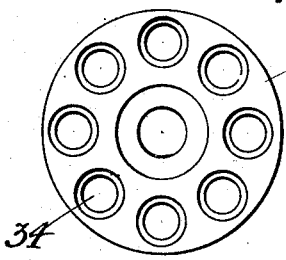
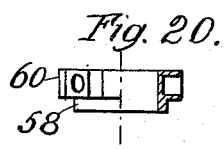
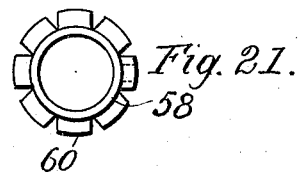
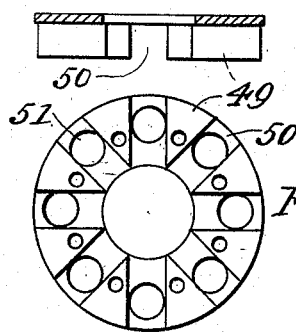
WITNESSES:
A. E. Miller
J. H. Hoffman
INVENTOR.
Albert Jones,
BY
Geo. W. T. Howard,
ATTORNEYS.

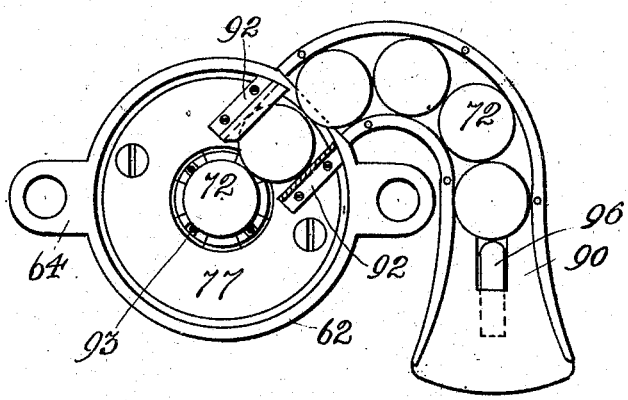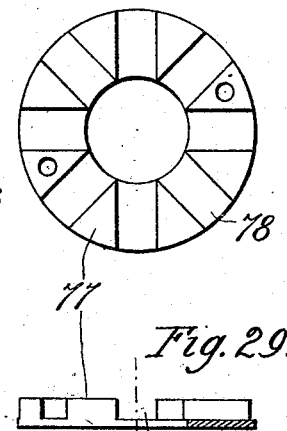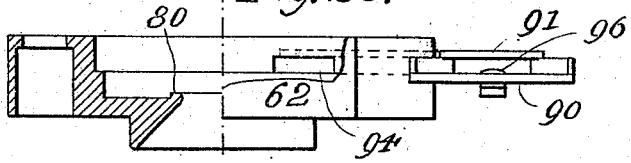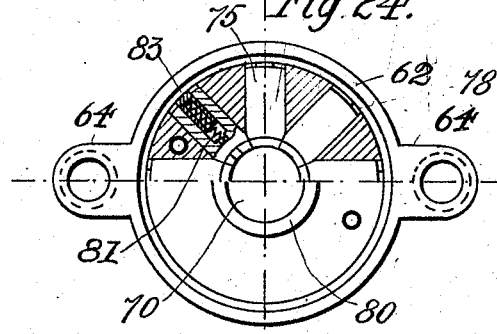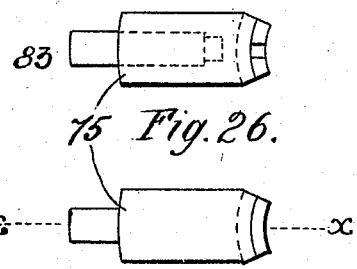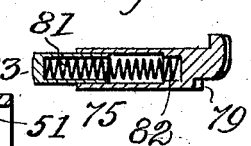

A. JONES.
MACHINE FOR SECURING SEALING CAPS TO BOTTLES.
APPLICATION FILED NOV. 17, 1904.
900,550.
Patented Oct. 6, 1908
10 SHEETS—SHEET 10.
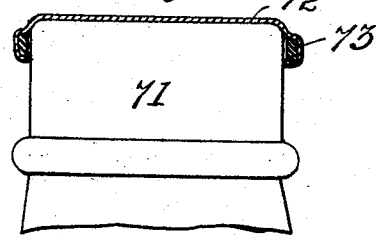
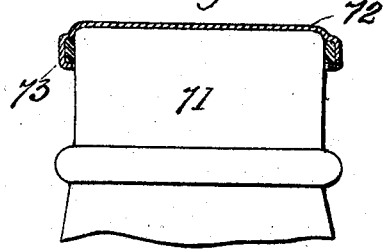
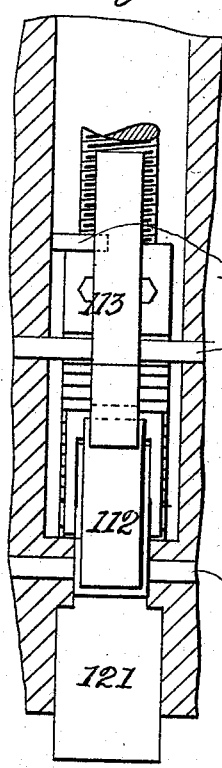
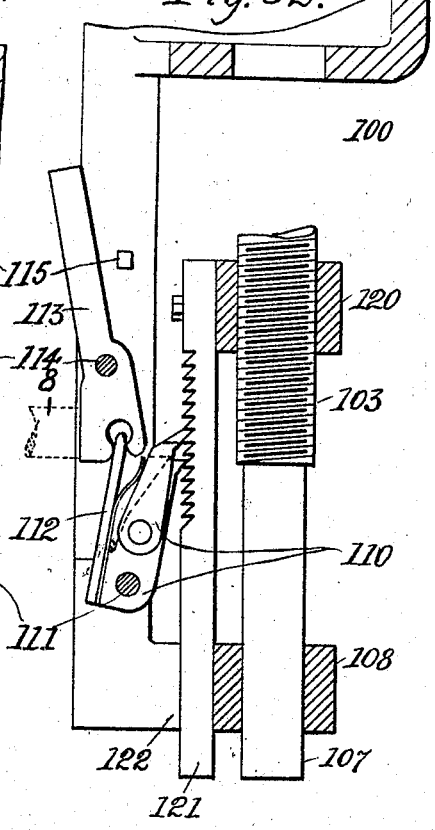
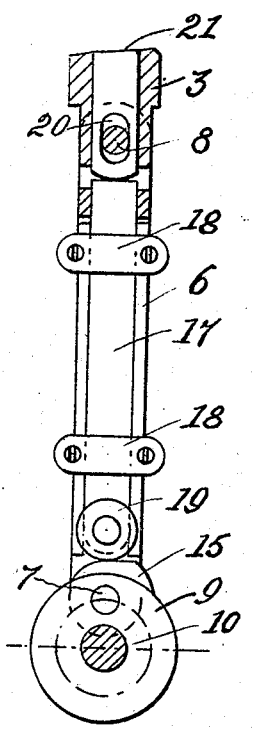
WITNESSES:
INVENTOR.
Albert Jones,
BY
ATTORNEYS.

UNITED STATES PATENT OFFICE.

ALBERT JONES, OF BALTIMORE, MARYLAND, ASSIGNOR TO LEWIS KALLING, OF BALTIMORE, MARYLAND.

MACHINE FOR SECURING SEALING-CAPS TO BOTTLES

No. 900,550.　　　　　Specification of Letters Patent.　　　　　Patented Oct. 6, 1908.

Application filed November 17, 1904. Serial No. 233,114.

*To all whom it may concern:*

Be it known that I, ALBERT JONES, of the city of Baltimore and State of Maryland, have invented certain Improvements in Machines for Securing Sealing-Caps to Bottles, of which the following is a specification.

This invention relates to an improved machine for securing to bottle heads, sealing caps, which inclose within their flange or vertical wall, an angular compressible gasket or packing ring.

Sealing caps of substantially the character described, are shown in Letters Patent Nos. 561,792 and 697,491, granted respectively, on the 9th day of June 1896, and the 15th day of April 1902, to Lewis Kalling, to which reference should be made. To secure the said sealing cap on a bottle head, a portion of the wall of the cap is crushed, flattened or elongated so as to compress the inclosed gasket or packing ring which forms a joint between the vertical wall or flange of the sealing cap and the surface of the bottle head, an operation which is performed in and by the machine forming the subject of the present invention, as hereinafter fully described.

The sealing cap shown, described in Letters Patent No. 697,491 has the edge of the vertical wall or flange turned inward to hold the annular gasket or packing ring in place, and one important office of the present invention is to prevent the straightening out of the inturned portion of the wall or flange of the cap, in the bottle capping operation, as will hereinafter fully appear.

In the further description of the said invention which follows, reference is made to the accompanying drawings forming a part hereof, and in which:—

Figure 1 is an exterior side view of the improved machine. Fig. 2 is an exterior front view of Fig. 1. Fig. 3 is a sectional view of Fig. 1. Figs. 4, 5, 6, 7 and 8, are enlarged central sectional views of the capping head of the machine, together with certain of its attachments, illustrating the relative positions of the various movable parts of the head before and during the sealing cap affixing operation hereinafter described. Fig. 4ᵃ is an enlarged view of one-half of Fig. 4. Fig. 9 is an enlarged partly sectional view of the said head, illustrating the relative position of its various parts with respect to a bottle should the same be subjected to the operation of the machine, without the capping head thereof being provided with a sealing cap. Fig. 10 is a top view of a portion of Fig. 3. Fig. 11 is a top view of a cylindrical block forming a part of the capping head. Figs. 12 and 13 are respectively, a half side section, and a top view of a ring forming a part of the capping head. Fig. 14 is a view similar to Fig. 13, except that certain attachments of the ring are shown. Figs. 15 and 16 are respectively, a top view and a central longitudinal section of one of a series of cap-drawing jaws. Fig. 17 is an underside view of Fig. 12 showing the cap-drawing jaws therein. Figs. 18 and 19 are respectively, a central section, and a top view of an annular plate, embodying recesses for the reception of the cap-drawing jaws. Figs. 20 and 21 are respectively, a half section, and a top view of a ring which is seated in the annular plate, shown in Figs. 18 and 19. Fig. 22 is a sectional view of the combined annular plate and ring, shown in Figs. 18, 19, 20 and 21. Figs. 23 and 24 are, respectively, a half side section, and a partly sectional top view of another ring forming a part of the capping head, and certain attachments, the former showing certain devices whereby sealing caps are guided into the capping head. Fig. 25 is a top view of Fig. 23. Fig. 26 illustrates top views of two of a series of cap-supporting jaws. Fig. 27 is a section of the lower view shown in Fig. 26 taken on the dotted line. *x—x.* Figs. 28 and 29 are respectively, an underside view, and a half side section of a retaining ring for the cap-supporting jaws shown in Fig. 26. Figs. 30 and 31 are enlarged details of a certain yielding and self adjusting rest or seat for the bottles to be capped, and hereinafter described. Figs. 32 and 33 illustrate modifications in the construction of the parts shown in Figs. 30 and 31. Figs. 34 and 35 show on a still larger scale, bottle heads with sealing caps thereon, the first figure illustrating the cap before, and the latter after the sealing operation. Figs. 36 to 39 inclusive are enlarged details of certain mechanism shown in Fig. 3.

Referring now to the drawings, and particularly to Fig. 3, 1 is the base of the machine, and 2 the columnar frame, bolted to the base. The upper portion of the columnar frame is bored to receive the hollow vertically moving bar 3, carrying at its upper end the bracket 5 to which the capping head hereinafter described is secured. At the lower end of the hollow bar 3, is formed an eye to which a rod 6 is jointed by means of a pin 8; and the lower extremity of the said rod is connected to the crank-pin 7 of the crank disk 9 fastened to the shaft 10, adapted to rotate in a bearing forming a portion of the base 1.

12 is the driving pulley, and 13 an ordinary clutch operated through the medium of a system of levers from the treadle 14, to start the revolution of the shaft, and effect the operation of the machine.

15 is a cam (see Figs. 3 to 9 inclusive and Fig. 36) secured to the crank pin 7; and 17 a bar of rectangular cross section (see Figs. 3 and 36) arranged to slide in a channel extending longitudinally of the rod 6, and retained in position by means of the plates 18.

At the lower end of the bar 17 is a pin carrying a roller 19 which rests on the operative portion of the cam 15, which in the construction shown, is its periphery. The upper end of the bar 17 projects into the forked end of the rod 6, and is in contact with the lower end of the rod 21 which is central within, and guided by the hollow bar 3.

The lower end of the rod 21 is slotted in order that the pin 8 will not interfere with its longitudinal motion. The slot is shown in Figs. 3 and 36, and denoted by 20.

The upper end of the rod 21 serves to operate in one direction a double ended lever 23 hereinafter described, and both it and the inner end of the lever 23 are yieldingly held down by a spring 25 and the sleeve 27 in which the said spring is confined by means of the nut 29 screwed into the bar 3.

30 is a fixed post projecting upward from the top of the columnar frame 2, and situated between the fixed lugs 31 extending rearward from the hollow bar 3. These devices serve to guide the hollow bar 3 in its up and down motion and prevent lateral or vibratory movement of the bracket 5 and the capping head which is dependent therefrom.

The capping head as an entirety is denoted by A, and it is shown on an enlarged scale in Figs. 4 to 9 inclusive. It consists of a central hollow cylindrical block 33, a top view of which is shown in Fig. 11.

34, 34 are cylindrical holes, preferably eight in number and equidistant apart, which extend entirely through the said cylindrical block in a vertical direction. These holes are contracted at the lower end for a purpose hereinafter described, and closed at the top by a circular plate 35 which is held in place on the block 33 by a shoulder 36, formed on a hollow stud 37 which is screwed into the block.

The portion of the stud 37 above the plate 35 slides in the bracket 5, and receives an up and down motion through the medium of the double ended lever 23, the outer end of which enters a slot 38 in the stud as shown in Figs. 3 and 4. It will be understood that the downward motion of the stud and its cylindrical block is effected by the upward movement of the bar 21, in which movement the spring 25 is compressed; and its upward motion, upon the return of the bar 21, by the extension of the said compressed spring.

40 is a ring hereinafter referred to as the upper ring, (see Figs. 4, 5, 12, 13, 14 and 17) adapted to slide vertically on the cylindrical block 33, having lugs 41 which are diametrically opposite each other. These lugs are bored to receive the stems 42, and are counterbored at the bottom to provide annular spaces around the said stems for the coiled springs 43 and the enlargements 44 of the stems, between which enlargements and the shoulders 45, the said springs are confined endwise.

47 is a cylindrical extension on the bottom of the upper ring 40 (see Fig. 12) having an inwardly projecting annular flange 48.

49 is an annular plate (see Figs. 18 and 19 which are respectively a half side section, and an underside view) having a diameter equal to that of the interior of the extension 47 of the upper ring 40, and provided with eight grooves 50, which extend radially from its inner diameter. In each of these grooves 50, is a cap-drawing or sealing jaw 52 (see Figs. 15 and 16, which are respectively a longitudinal section, and a top view of one of the jaws). These jaws which serve to draw and flatten the head or vertical wall of the sealing cap containing the joint forming gasket or packing ring, have beveled or inclined lugs 53, and at their inner ends are provided with downwardly extending lips 54 with curved cap drawing faces 55.

The outward movement of the cap drawing jaws is limited by their lips 54, coming in contact with the inner circumference of the inwardly projecting flange 48, which movement is influenced by the coiled springs 56 confined within pockets formed in the ring 58 shown particularly in Figs. 20, 21 and 22, and have their outer ends in contact with the lugs 53.

The ring 58 fits within the annular plate 49 and is provided with a flange 60 which is notched to produce projections which enter and fit the grooves 50 in the said annular plate. When these two parts are brought together they form practically one body in which the cap-drawing jaws are confined and adapted to slide.

62 is a second and lower ring (see Figs. 23 and 24) bored to fit around the downward extension 47 of the upper ring 40; and it has lugs 64 which in position correspond with the lugs 41 of the upper ring 40. These lugs 64 are bored and counterbored like those 41, to receive the lower portions of the stems 42, which stems at their bottom ends have screw caps 65 situated within the said lugs.

66, 66 are springs which have the same strength or tension as the springs 43 coiled about the stems 42 and confined endwise between the shoulders 68 and the caps 65.

The contracted portion of the lower ring 62 is centrally bored, the hole 70 having a diameter somewhat greater than that of the sealing cap to be affixed to the bottle head; and the said hole is flared outwardly as shown, to facilitate the entrance thereto of the bottle head.

The bottle head is denoted by 71 and the sealing cap by 72 (see Figs. 34 and 35) the former as before stated, showing the cap before and the latter the same after the sealing operation. The gasket or packing ring is denoted by 73.

75, 75 are the cap supporting jaws, shown particularly in Figs. 27 and 26 which are respectively a longitudinal section of one jaw, and a top view of two jaws. These jaws are placed on the upper and horizontal surface of the contracted portion of the lower ring 62, and covered, with the exception of their inner ends which project upward as lips, by a radially grooved annulus 77, the grooves of which are denoted by 78, constituting pockets in which the said jaws slide radially. The inner ends of these jaws have faces which are curved, as shown in Fig. 27, and the upper surfaces of the lips form a continuous ring constituting the support for the sealing caps, which support is in alinement with the upper surface of the annulus 77.

The inward movement of the cap supporting jaws is limited by the shoulders 79 coming against the lip 80 at the inner circumference of the lower ring 62; and the said movement is effected by the springs 81 in pockets 82 (see Figs. 24, 26 and 27). The outer ends of the said springs are confined in headed shells 83 which bear against the inner circumference of the contracted portion of the ring 62.

85, 85 are bolts with conical lower ends situated in the holes 34 in the cylindrical block 33, with their points which pass through holes 51 in the annulus 49, and come in contact with the inclined lugs 53 of the cap drawing jaws. They are spring held, and the springs 86 have sufficient strength to cause the cap drawing jaws to draw the sealing caps over the bottle head and effect the sealing or capping operation; but said springs allow the said jaws to yield when sufficient stress is applied to effect that result, thereby eliminating the possibility of crushing the bottle heads.

87 and 88 are collars on the stems 42 with which collars by means of the springs 66 and 43, the upper surfaces of the lower and upper rings 62 and 40 respectively, are normally held in contact, when the capping head is in its highest position. The upper ends of the stems 42 are secured to lugs forming parts of the bracket 5.

90 is a channel, (see Figs. 23 and 25) whereby sealing caps are introduced into the capping head. Its width is slightly greater than the exterior diameter of the sealing caps, and its depth somewhat exceeds the thickness of the caps; and it is preferably covered by a plate 91 shown in Fig. 23. This channel is secured in any suitable manner to the lower ring 62 the wall of which is provided with an opening 94 of such size as will admit of the passage of the sealing caps into the capping head.

92, 92 are guides which form a continuation of the channel 90 within the capping head. They are fastened to the upper surface of the slotted annulus 77, and provided with overhanging lips one of which is shown as removed in Fig. 25.

The bed of the channel 90 is in horizontal alinement with the cap supporting surface of the jaws 75, as shown in Fig. 23.

By reference to Figs. 15, 16, 17 and 25, it will be seen that three of the cap-drawing jaws are furnished with pins 93 arranged with respect to the guides 92 as shown in Figs. 17 and 25, that is to say, one pin stops an entering sealing cap when it reaches the center of a capping head, while the others prevent its lateral displacement. In Fig. 25 these pins would not properly appear, and they are only shown to illustrate their office as described.

Within the flaring mouth of the channel 90 is situated a leaf spring 96 the active end of which passes through a hole in and extends slightly above the bed of the channel. The purpose of this spring is to confine in close contact, a predetermined number of sealing caps within the channel, and with the first one of the series in capping position in the capping head, as shown in Fig. 25.

The bottle seat hereinbefore briefly referred to, and which is represented as an entirety by B, consists in a combination of devices as follows:

100 is a hollow bracket projecting from the columnar frame 2 and directly below the capping head. Its upper and lower walls are bored in vertical alinement with the axis of the said head and in the upper hole is placed a cylindrical nut 101 having wings to prevent its turning, as shown in Figs. 3, 37 and 38.

102 is a spiral sprng which yieldingly supports the nut 101, and within the nut is placed a hollow screw 103 carrying a bottle holder 104 at its upper end. The holder 104 is dished and the surfaces of the dished portion are grooved as shown in Figs. 3 and 39.

Within this holder is placed a block, preferably of rubber, upon which the bottles to be sealed are placed. The grooves in the holder communicate with the hole in the screw 103 in order that any liquid collecting on the top of the seat may escape.

By turning the bottle holder on its axis, its position may be adjusted to suit bottles of various heights; and it may be locked when adjusted, by the locking nut 106.

The tail piece 107 of the screw 103 passes through the lower wall of the hollow bracket 100 and also through a guide 108 situated beneath and forming a part of the said bracket. The upper portion of the said tail piece is formed as a cylindrical rack 109 which in certain circumstances hereinafter described, is acted upon by differential pawls 110 pivoted to the bracket at 111. To these pawls is fastened a vertical extension 112 which is jointed to the lower end of a lever cam 113 fulcrumed within the bracket at 114.

115 is a stop to prevent the outer movement of the upper end of the lever cam.

By reference to Figs. 3 and 30 it will be seen that the pin 8 of the joint 6 extends to contact with the inoperative portion of the lever cam; and the construction and arrangement of the parts are such, that when the capping head has reached a point in its downward travel, a pre-determined distance, say, one-half of an inch from its extreme limit, the pin 8 will have moved the lever cam 113 inward to such a distance that one or the other of the differential pawls 110 will engage the rack and lock the bottle seat.

The differential pawls may be yieldingly held from contact with the teeth of the rack 109 by providing the guide 108 with a lug, and inserting between the lug and the end or butt of the pawls, a suitable spring, as shown in dotted lines in Fig. 30.

An alternative construction of the mechanism shown in Figs. 30 and 31 is illustrated in Figs. 32 and 33 to which reference should now be made. In the said figures the hollow screw 103 is provided with a nut 120 which is situated below the hollow bracket 100, to which is fastened a flat rack 121 guided at its lower end by the guide 122 which is shown as constituting a part of the guide 108. This flat rack has the advantage over the cylindrical rack, in that a larger and a straight surface is presented to the differential pawls 110, and the wear of the parts is thereby reduced.

Supposing the bottle seat to have been adjusted in height by turning it on its axis so as to suit bottles of a certain standard length, which length however frequently varies to the extent of about one-half an inch, and an uncapped bottle is standing on the said seat; and that the various parts of the machine occupy the relative positions indicated in Figs. 1, 2, 3 and 4, the elements of the capping head will be relatively placed as shown in Fig. 4, which represent what I term the first position. At this time the crank pin 7 is in its highest point, and the position of the cam 15 such that the upper and lower rings 40 and 62 are separated to their extreme limit, and bear against the collars 88 and 87, respectively. The conical ends of the stems 85 will then be in contact with the inclined surfaces of the lugs 53 of the cap drawing jaws 52, and will have closed the said jaws completely. The lower surface of the cylindrical block 33 will then be in contact with the shoulder formed by the contracted portion of the upper ring within the same, thus preventing further downward movement of the stems 85.

In Figs. 4, 5, 6, 7, 8 and 9 many of the reference numerals are omitted, as their insertion would tend to obscure the delineation of parts of the capping mechanism, and reference should therefore be made also to Figs. 22, 23, 24 and 25 which illustrate certain of the said parts in the peculiar relative positions, shown in Figs. 4 to 9 inclusive.

When the capping head is in the 1st position, it is ready to receive a sealing cap as a preparatory step towards the capping operation. The channel 90 being filled between the plate spring 96 and the inner ends of the guides 92, another sealing cap is inserted in the said channel by being pushed over the plate spring, and in this operation the first cap inserted, is pushed centrally of the cap supporting jaws when it is stopped and centered by the pins 93. The machine is now placed in operation, the crank disk taking the direction indicated by the curved arrows, and as the cam 15 passes from the first, to the second position shown in Fig. 6, the lower surface of the circular block 33 is brought in contact with the shoulder formed by the contracted portion 47 of the upper ring 40.

Before reaching the second position, the sealing cap will have been clamped between the cap drawing, and the cap-supporting jaws, and as soon as this clamping operation has taken place, a combined downward movement of the upper and lower rings 40 and 62 with their attachments is effected by the cam 15, and at the same time the capping head as an entirety together with the sealing cap is brought down until the sealing cap is seated firmly on the bottle head. It will be understood that in view of the springs 86 overcoming the resistance of the springs 66, the sealing cap is prevented from passing into the throat formed by the closed drawing jaws, and effecting a premature crushing or drawing of the portion of the cap flange which incloses the joint forming gasket or ring.

As the capping head passes from the second to the third position, the cam 15 is inoperative and the bottle with a cap seated on its head is carried downward by the action of the crank until it reaches a point at which the final sealing or capping operation takes place, which is say, one-half an inch from the termination of the downward stroke of the crank.

In the downward movement of the head as an entirety, and the bottle, as described, the resistance of the spring 102 which sustains the bottle seat, is overcome by the springs 86, and upon the sealing or capping point before referred to being reached, the pin 8 puts in operation the lever cam 113 which has the effect of engaging one of the differential pawls 110 with the rack 109, and all further downward movement of the bottle seat is prevented.

As the crank moves from the third to the fourth position, the final sealing or capping operation takes place, which operation consists first in the downward motion of the head with the exception of the lower ring 62 which remains stationary. This complex movement causes the cap-drawing jaws to be forced over the cap, and upon its termination by the collars 87 coming in contact with the lower ring 62, the entire head is brought down until the crank pin reaches the lower center.

From the foregoing description it will appear that as the sealing cap is held tightly between the cap drawing, and cap-supporting jaws during the first portion of the final capping operation, the inturned edge of the flange of the sealing cap therefore cannot change from its introverted condition, and there is no possibility of the inclosed gasket or packing ring becoming displaced, or partially escaping from the caps as it is compressed.

In the cap-drawing or sealing operation, the cap-drawing jaws 52 being yieldingly held by the springs 86, distend slightly should the bottle head be larger in diameter than the normal size.

It must be borne in mind that the sealing operation consists in the reduction in diameter of the flange of the sealing cap, and the consequent reduction in thickness of the joint-forming ring or gasket which is interposed between the bottle head and the said flange, and this is exactly what is performed in the operations above described.

In the crank passing from the fourth to the fifth position, the entire head is elevated, the upper ring and the cylindrical block moving more rapidly than the lower ring, owing to the action of the cam 15, and in consequence, the conically pointed stems are withdrawn from contact with the inclined surfaces of the jaws 52 and the said jaws are allowed to distend, and be removed from the sealing cap on the bottle.

In view of the rounded surface of the cap-supporting jaws 75 and the weakness of the springs 81, the said devices have no tendency to lift the bottle from its seat, the said jaws yielding as the head is lifted from the bottle.

It will be understood that a continued upward movement of the head as just described, returns the head to the first position, when another sealing cap is introduced into the channel 90, and the apparatus is then ready for the next sealing operation.

In case the machine is put in operation with a bottle on its seat, but no sealing cap in position, the movement of the capping head performs no function, the bottle head entering the throat or clear space within the cap-drawing jaws without being touched by them, as shown in the sixth position, Fig. 9.

I claim as my invention:

1. In a machine to compress an annular gasket or joint forming ring, between the flange of a sealing cap and the surface of a bottle head, the combination of a capping mechanism provided with cap-drawing devices, and cap-supporting devices, means to effect the holding of a sealing cap between the said cap-drawing and cap-supporting devices, means to bring a bottle head within the held sealing cap and to jointly put in motion the cap-drawing devices to effect the sealing of the bottle, substantially as specified.

2. In a machine to compress an annular gasket or joint forming ring between the flange of a sealing cap and the surface of a bottle head, the combination of a capping mechanism provided with cap-drawing devices, and cap-supporting devices, means to effect the holding of a sealing cap between the said cap-drawing and cap-supporting devices, and means to bring a bottle head within the held sealing cap and move the capping mechanism as an entirety down and along the sealing cap, substantially as specified.

3. In a machine to compress an annular gasket or joint forming ring, between the flange of a sealing cap and the surface of a bottle head, the combination of a seat for the bottle, a capping mechanism provided with cap drawing devices, and cap-supporting devices, mechanism to effect a vertical reciprocating motion of the capping mechanism as an entirety, and other mechanism to produce an independent reciprocating motion of the cap-drawing and the cap-supporting devices, substantially as specified.

4. In a machine to compress an annular gasket or joint forming ring, between the vertical flange of a sealing cap and the surface of a bottle head, for the purpose described, the combination of a seat for the bottle, a capping mechanism provided with yieldingly-held cap-drawing devices, distensible supporting devices for the sealing caps, mechanism to effect a vertical reciprocating motion of the said capping mechanism, and other mechanism to produce an up-and-down motion of one of the said sets of devices independently of the other, substantially as specified.

5. In a machine to compress an annular gasket or joint forming ring, between the vertical flange of a sealing cap and the surface of a bottle head, for the purpose described, the combination of a seat for the bottle, a capping mechanism provided with yieldingly-held cap-drawing devices, distensible cap-supporting devices, means to introduce sealing caps to the cap-supporting devices, mechanism to effect a vertical reciprocating motion of the said capping mechanism, and other mechanism to produce an up-and-down motion of one or both of the said sets of devices independently of the other, substantially as specified.

6. In a machine to compress an annular gasket or joint forming ring, between the vertical flange of a sealing cap and the surface of a bottle head, for the purpose described, the combination of a seat for the bottle, a capping mechanism provided with cap-drawing devices, and means to sustain them yieldingly in capping position; cap-supporting devices, sustaining appliances to hold the said cap-supporting devices yieldingly in cap-supporting position, mechanism to effect a movement of the capping mechanism as an entirety towards and away from the bottle seat, and other mechanism to produce an independent vertical reciprocating motion of the said sets of devices independently of the other, substantially as specified.

7. In a machine to compress an annular gasket or joint forming ring, between the vertical flange of a sealing cap and the surface of a bottle head, for the purpose described, the combination of a seat for the bottle, a capping mechanism provided with cap-drawing and cap-supporting devices, and a mechanism whereby the capping mechanism as an entirety, and the elements thereof which carry the cap-drawing and cap-sustaining devices, are independently moved in an upward and downward motion, substantially as specified.

8. In a machine to compress an annular gasket or joint forming ring, between the vertical flange of a sealing cap and the surface of a bottle head, for the purpose described, the combination of a seat for the bottle, a capping mechanism provided with cap-drawing and cap-supporting devices, and a combined crank and cam mechanism whereby the capping mechanism as an entirety, and the elements thereof which carry the cap-drawing and the cap-sustaining devices are independently moved in an upward and downward motion, substantially as specified.

9. In a machine to compress an annular gasket or joint-forming ring, between the vertical flange of a sealing cap and the surface of a bottle head, the combination of a bottle seat, a capping-head comprising a central annular or hollow cylindrical block, a ring placed exteriorly of and adapted to have a sliding movement on the said block, cap-drawing jaws supported by the said ring, spring-held appliances situated within the said block whereby the said cap-drawing jaws are retained in capping position, a second ring which surrounds the first ring and is arranged to slide thereon, spring-held cap-supporting devices which are carried by the second ring, and spring appliances which tend to retain the said rings separated independently of the central block, substantially as specified.

10. In a machine to compress an annular gasket or joint-forming ring between the vertical flange of a sealing cap and the surface of a bottle, the combination of a bottle seat, a vertically movable capping head comprising a central block, a ring adapted to slide vertically of the said block and carrying a system of radially arranged spring held cap drawing jaws, a second ring adapted to slide on the first, a system of distensible cap-supporting jaws situated within the second ring, mechanism to elevate the upper ring with its cap-supporting jaws upon the central block, and the lower ring upon the first ring, whereby the operative elements of the capping head are brought into capping condition, and mechanism to bring the said head while in capping condition over the head of a bottle standing on a seat, substantially as specified.

11. A bottle-capping head, having in combination, a central block, a ring carrying cap-drawing jaws, a second ring carrying cap-supporting devices, stems to connect the said rings, springs which yieldingly hold the rings in a separated position, and means to force one ring towards the other, substantially as specified.

12. In a machine for securing sealing caps to bottles, the combination of a frame carrying a capping-head embodying cap-drawing and cap-supporting devices which, in the capping operation, have to be placed in various relative positions, a driving shaft carrying substantially a crank and a cam, bars operated independently of each other by the said crank and cam, and a mechanism adapted to impart an up-and-down movement to the said capping-head, to which the said bars communicate movement, one of the said bars modifying the effect of the other in the said up-and-down motion of the said elements of capping head, substantially as and for the purpose specified.

13. In a machine for securing sealing caps to bottles, a capping-head, combined with a yielding bottle seat, and devices, actuated from the capping-head, and coöperating with the yielding bottle seat, when the parts have reached a predetermined position, to arrest the motion of the bottle seat, substantially as and for the purpose specified.

14. In a machine for securing sealing caps to bottles, a capping head combined with a spring-held seat for the bottles, said seat provided with a rack, combined with a pawl mechanism, devices actuated from the appliances which actuate the parts of the capping-head, and which, at a predetermined point in the movement of the parts of the capping-head, engage the said pawl mechanism and cause the same to coöperate with the said rack, and thereby hold the bottle seat from further depression, substantially as and for the purpose specified.

15. In a machine for securing sealing caps to bottles, a capping mechanism, a spring-held seat for bottles to be capped, said seats having a rack which has a vertical movement in common with the seat, combined with pawl mechanism which is normally inoperative, and devices actuated from the capping mechanism, and causing the pawl mechanism to become operative, by engagement with the rack, at a predetermined position of the parts of the capping mechanism, and so prevent further depression of the bottle seat, substantially as and for the purpose specified.

16. In a machine for securing sealing caps to bottles, a capping mechanism, a vertical adjustable bottle seat, a sustaining spring for the said seat, a rack-bar having a vertical reciprocating movement in common with the seat, combined with a pawl held yieldingly from contact with the said rack-bar, and a mechanism actuated from the capping mechanism, which, as the capping mechanism reaches a predetermined point in its downward movement, forces the said pawl into engagement with the said rack-bar, and so prevents its downward motion, substantially as and for the purpose specified.

17. In a machine for securing sealing caps to bottles, a capping-head provided with cap-drawing devices and with a cap-centering means consisting of a plurality of pins secured to the cap-drawing devices, substantially as specified.

18. In a machine for securing sealing caps to bottles, a capping mechanism provided with cap-drawing and cap-supporting devices, and with yielding connections between the said sets of devices, and yielding connections for driving one of the sets independently of the other, substantially as specified.

19. In a machine for applying bottle seals, a bottle support, means acting through a bottle to be sealed, to depress said support upon the application of the initial pressure, whereby said support is moved to a point to receive the final sealing pressure, and means for locking said support in such position, so that excessive pressure cannot be placed upon the bottle notwithstanding variations in the length of the bottles to be sealed.

20. In a machine for applying bottle seals, a sealing head, a bottle support, means for moving one of said parts relative to the other to get the desired sealing pressure, one of said parts being adapted to be operated upon by the other through the instrumentality of the bottle to be sealed, to cause the part operated upon to be moved to a point to apply the final sealing pressure, and means for locking said part in such position, so that excessive pressure cannot be placed upon the bottle notwithstanding variations in the length of the bottles to be sealed.

21. In a machine for applying bottle seals, a seal applying plunger, a bottle support, said plunger being adapted to act upon a bottle upon the support to cause said support to be depressed to proper position relative to the seal applying plunger, upon the application of initial sealing pressure, and means for maintaining said support in such position to receive the final sealing pressure whereby only substantially the required pressure is applied to the bottle regardless of variations in length thereof, substantially as specified.

22. In a machine for applying bottle seals, a pressure applying head, means for moving said head vertically, means for returning said head to normal position, a bottle support, a rack upon said support, a device adapted to engage said rack to arrest the downward movement of the bottle support for the purpose set forth, and means for actuating said device upon the downward movement of the head to cause it to engage said rack.

23. In a machine for applying bottle seals, a yielding seal-applying plunger, a bottle support, said plunger being adapted to act upon a bottle upon the support, to cause said support to be depressed to proper position relative to the seal applying plunger, upon the application of initial sealing pressure, and means for maintaining said support in such position to receive the final sealing pressure, so that excessive pressure cannot be placed upon the bottle notwithstanding variations in the length of the bottles to be sealed.

ALBERT JONES.

Witnesses:
OREGON MILTON DENNIS,
JOHN H. SPARHAUK.